(12) United States Patent
Tang et al.

(10) Patent No.: US 8,000,033 B1
(45) Date of Patent: Aug. 16, 2011

(54) PHOTOGRAPHING OPTICAL LENS ASSEMBLY

(75) Inventors: Hsiang Chi Tang, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/952,344

(22) Filed: Nov. 23, 2010

(30) Foreign Application Priority Data

Sep. 8, 2010 (TW) .............................. 99130290 A

(51) Int. Cl.
*G02B 3/02* (2006.01)
*G02B 13/18* (2006.01)

(52) U.S. Cl. ........ 359/716; 359/645; 359/651; 359/738; 359/739; 359/784

(58) Field of Classification Search .................. 359/645, 359/651, 716, 738, 739, 784
See application file for complete search history.

(56) References Cited

U.S. PATENT DOCUMENTS

| | | | |
|---|---|---|---|
| 7,436,603 B2 | 10/2008 | Huang et al. | |
| 7,525,741 B1 | 4/2009 | Noda | |
| 7,804,653 B2 * | 9/2010 | Choi | 359/716 |
| 7,907,356 B2 * | 3/2011 | Isono | 359/784 |
| 2009/0046380 A1 * | 2/2009 | Tang | 359/784 |
| 2010/0202065 A1 * | 8/2010 | Tang et al. | 359/784 |
| 2010/0259838 A1 * | 10/2010 | Tsai et al. | 359/716 |
| 2010/0321798 A1 * | 12/2010 | Chen et al. | 359/738 |
| 2011/0090392 A1 * | 4/2011 | Tang et al. | 359/716 |

* cited by examiner

*Primary Examiner* — Evelyn A. Lester
(74) *Attorney, Agent, or Firm* — Tim Tingkang Xia; Morris, Manning & Martin, LLP

(57) ABSTRACT

The present invention provides a photographing optical lens assembly comprising, in order from an object side to an image side: a first lens element with positive refractive power having a convex object-side surface and a concave image-side surface; a second lens element with negative refractive power having a concave object-side surface and a convex image-side surface, the object-side and image-side surfaces thereof being aspheric; and a third lens element with negative refractive power having a convex object-side surface and a concave image-side surface, the object-side and image-side surfaces thereof being aspheric and at least one inflection point being formed on the image-side surface, wherein the lens assembly is further provided with a stop disposed between an object and the first lens element.

16 Claims, 18 Drawing Sheets

| TABLE 1 | | | | | | | |
|---|---|---|---|---|---|---|---|
| (Embodiment 1) | | | | | | | |
| f = 2.84 mm, Fno = 2.03, HFOV = 31.8 deg. | | | | | | | |
| Surface # | | Curvature Radius | Thickness | Material | Index | Abbe # | Focal length | Effective Semi-diameter |
| 0 | Object | Plano | Infinity | | | | | |
| 1 | Ape. Stop | Plano | -0.200 | | | | | |
| 2 | Lens 1 | 1.175790 (ASP) | 0.638 | Plastic | 1.544 | 55.9 | 2.29 | 0.692 |
| 3 | | 16.435900 (ASP) | 0.099 | | | | | 0.658 |
| 4 | | Plano | 0.260 | | | | | 0.660 |
| 5 | Lens 2 | -0.913470 (ASP) | 0.300 | Plastic | 1.632 | 23.4 | -8.20 | 0.661 |
| 6 | | -1.249840 (ASP) | 0.388 | | | | | 0.744 |
| 7 | Lens 3 | 1.763210 (ASP) | 0.647 | Plastic | 1.544 | 55.9 | -55.73 | 1.084 |
| 8 | | 1.450850 (ASP) | 0.250 | | | | | 1.403 |
| 9 | IR-filter | Plano | 0.300 | Glass | 1.517 | 64.2 | - | |
| 10 | | Plano | 0.100 | | | | | |
| 11 | Cover-glass | Plano | 0.400 | Glass | 1.517 | 64.2 | - | |
| 12 | | Plano | 0.136 | | | | | |
| 13 | Image | Plano | - | | | | | |
| Note: Reference wavelength is d-line(587.6nm) | | | | | | | | |
| Effective radius of surface #4 is 0.660mm | | | | | | | | |

Fig.5

| TABLE 2 | | | | | | |
|---|---|---|---|---|---|---|
| Aspheric Coefficients | | | | | | |
| Surface # | 2 | 3 | 5 | 6 | 7 | 8 |
| k = | -6.56758E-01 | -1.00000E+00 | -9.01567E-01 | 7.84458E-01 | -1.49920E+01 | -8.11561E+00 |
| A4 = | 2.89393E-02 | -6.38412E-02 | -1.48973E-01 | -6.62867E-02 | -2.72317E-01 | -1.61010E-01 |
| A6 = | 1.33684E-02 | -2.79416E-01 | 1.16235E+00 | 1.25741E+00 | 3.09027E-01 | 8.95681E-02 |
| A8 = | 1.55218E-01 | 1.04762E+00 | 3.47708E-01 | -1.71881E-01 | -2.84581E-01 | -4.69610E-02 |
| A10= | -4.16143E-01 | -1.79952E+00 | -2.73519E+00 | -2.53114E-01 | 1.53483E-01 | 8.60208E-03 |
| A12 = | 1.53276E-02 | -1.78113E-03 | -6.82696E-03 | 4.26129E-03 | -4.05076E-02 | 3.42063E-04 |
| A14= | -2.52410E-03 | -1.28159E-02 | -2.89746E-02 | 3.21688E-03 | -1.00732E-02 | -3.96340E-04 |
| A16= | 3.47729E-03 | -1.99506E-03 | 2.02013E-02 | 9.69079E-03 | 7.95579E-03 | -8.10865E-06 |

Fig.6

| TABLE 3 | | | | | | | | |
|---|---|---|---|---|---|---|---|---|
| (Embodiment 2) | | | | | | | | |
| f = 2.20 mm, Fno = 2.87, HFOV = 33.2 deg. | | | | | | | | |
| Surface # | | Curvature Radius | Thickness | Material | Index | Abbe # | Focal length | Effective Semi-diameter |
| 0 | Object | Plano | Infinity | | | | | |
| 1 | Ape. Stop | Plano | -0.144 | | | | | |
| 2 | Lens 1 | 0.574800 (ASP) | 0.369 | Plastic | 1.544 | 55.9 | 1.63 | 0.377 |
| 3 | | 1.269600 (ASP) | 0.278 | | | | | 0.352 |
| 4 | Lens 2 | -1.185470 (ASP) | 0.280 | Plastic | 1.632 | 23.4 | -6.07 | 0.384 |
| 5 | | -1.872410 (ASP) | 0.324 | | | | | 0.566 |
| 6 | Lens 3 | 3.131500 (ASP) | 0.447 | Plastic | 1.544 | 55.9 | -6.06 | 0.910 |
| 7 | | 1.525310 (ASP) | 0.200 | | | | | 1.100 |
| 8 | IR-filter | Plano | 0.400 | Glass | 1.517 | 64.2 | - | |
| 9 | | Plano | 0.076 | | | | | |
| 10 | Image | Plano | - | | | | | |
| Note: Reference wavelength is d-line(587.6nm) | | | | | | | | |

Fig.7

| TABLE 4 | | | | | | |
|---|---|---|---|---|---|---|
| Aspheric Coefficients | | | | | | |
| Surface # | 2 | 3 | 4 | 5 | 6 | 7 |
| k = | 3.88161E-02 | 1.05081E+01 | 1.86717E+00 | -1.14461E+00 | -2.22361E+02 | -2.15238E+01 |
| A4 = | -3.08713E-02 | -1.39623E-02 | -1.06380E+00 | -7.24204E-01 | -8.17277E-01 | -4.19090E-01 |
| A6 = | 2.57658E+00 | -4.61018E-01 | -3.68074E+00 | 2.54819E+00 | 6.77648E-01 | 2.47891E-01 |
| A8 = | -1.49944E+01 | -2.20517E+01 | 4.08345E+01 | -3.91872E-01 | -1.22494E-01 | -3.33764E-01 |
| A10= | 6.85974E+01 | 8.17383E+01 | -1.55050E+02 | -9.78736E+00 | 4.08123E-02 | 1.74269E-01 |
| A12 = | | | -1.53435E+03 | 2.43421E+01 | 8.39879E-02 | 7.24811E-03 |
| A14= | | | | | 6.18261E-03 | -4.15875E-02 |
| A16= | | | | | -1.32179E-01 | -9.31799E-04 |

Fig.8

| TABLE 5 | | | | | | | |
|---|---|---|---|---|---|---|---|
| (Embodiment 3) | | | | | | | |
| f = 2.55 mm, Fno = 2.80, HFOV= 34.1 deg. | | | | | | | |
| Surface # | | Curvature Radius | Thickness | Material | Index | Abbe # | Focal length | Effective Semi-diameter |
| 0 | Object | Plano | Infinity | | | | | |
| 1 | Ape. Stop | Plano | -0.097 | | | | | |
| 2 | Lens 1 | 1.012810 (ASP) | 0.374 | Plastic | 1.544 | 55.9 | 2.23 | 0.473 |
| 3 | | 5.291000 (ASP) | 0.486 | | | | | 0.511 |
| 4 | Lens 2 | -1.088390 (ASP) | 0.270 | Plastic | 1.632 | 23.4 | -10.07 | 0.575 |
| 5 | | -1.439100 (ASP) | 0.374 | | | | | 0.686 |
| 6 | Lens 3 | 1.095890 (ASP) | 0.481 | Plastic | 1.544 | 55.9 | -13.91 | 1.083 |
| 7 | | 0.809260 (ASP) | 0.400 | | | | | 1.336 |
| 8 | IR-filter | Plano | 0.300 | Glass | 1.517 | 64.2 | - | |
| 9 | | Plano | 0.203 | | | | | |
| 10 | Image | Plano | - | | | | | |
| Note: Reference wavelength is d-line(587.6nm) | | | | | | | | |

Fig.9

| TABLE 6A | | | | | |
|---|---|---|---|---|---|
| Aspheric Coefficients | | | | | |
| Surface # | 2 | 3 | 4 | 5 | 6 |
| k = | -3.88762E-01 | -1.00000E+00 | -7.67606E-01 | 1.30371E+00 | -7.54127E+00 |
| A4 = | 9.29232E-02 | -1.38417E-01 | -2.52360E-01 | -2.55777E-01 | -5.53581E-01 |
| A6 = | -8.56915E-01 | 3.01275E-01 | 6.84108E-01 | 1.30063E+00 | 3.48898E-01 |
| A8 = | 3.24721E+00 | -2.10428E+00 | 1.76560E+00 | 1.21365E-01 | -2.39711E-01 |
| A10= | -5.92948E+00 | 1.93093E-01 | -5.95601E+00 | 6.03902E-01 | 1.78695E-01 |
| A12 = | 2.82059E+00 | 5.57067E+00 | 2.40134E-01 | 2.19844E-01 | -2.92031E-02 |
| A14= | -2.52411E-03 | -1.28159E-02 | -2.43037E-02 | 4.25538E-02 | -1.14840E-02 |
| A16= | 3.47725E-03 | -1.99505E-03 | 4.02828E+00 | -4.78006E+00 | -5.46322E-04 |

Fig.10A

| TABLE 6B | |
|---|---|
| Aspheric Coefficients | |
| Surface # | 7 |
| k = | -5.26142E+00 |
| A1 = | |
| A2 = | |
| A3 = | |
| A4 = | -2.57860E-01 |
| A5 = | |
| A6 = | 6.82952E-02 |
| A7 = | |
| A8 = | -4.53203E-02 |
| A9 = | |
| A10= | 1.42966E-02 |
| A11= | |
| A12= | 1.12629E-03 |
| A13= | |
| A14= | -2.73188E-03 |
| A15= | |
| A16= | 6.19265E-04 |

Fig.10B

| TABLE 7 | | | | | | | |
|---|---|---|---|---|---|---|---|
| (Embodiment 4) | | | | | | | |
| f = 2.75 mm, Fno = 2.45, HFOV = 32.3 deg. | | | | | | | |
| Surface # | | Curvature Radius | Thickness | Material | Index | Abbe # | Focal length | Effective Semi-diameter |
| 0 | Object | Plano | Infinity | | | | | |
| 1 | Ape. Stop | Plano | -0.090 | | | | | |
| 2 | Lens 1 | 0.993770 (ASP) | 0.493 | Plastic | 1.544 | 55.9 | 2.20 | 0.656 |
| 3 | | 4.830900 (ASP) | 0.385 | | | | | 0.646 |
| 4 | Lens 2 | -1.070420 (ASP) | 0.270 | Plastic | 1.650 | 21.4 | -7.42 | 0.625 |
| 5 | | -1.512340 (ASP) | 0.392 | | | | | 0.696 |
| 6 | Lens 3 | 2.226190 (ASP) | 0.743 | Plastic | 1.544 | 55.9 | -22.78 | 1.018 |
| 7 | | 1.665340 (ASP) | 0.400 | | | | | 1.406 |
| 8 | IR-filter | Plano | 0.300 | Glass | 1.517 | 64.2 | - | |
| 9 | | Plano | 0.192 | | | | | |
| 10 | Image | Plano | - | | | | | |
| Note: Reference wavelength is d-line(587.6nm) | | | | | | | | |

Fig.11

| TABLE 8 | | | | | | |
|---|---|---|---|---|---|---|
| Aspheric Coefficients | | | | | | |
| Surface # | 2 | 3 | 4 | 5 | 6 | 7 |
| k = | -5.02950E-01 | -1.00000E+00 | -4.10855E-01 | 1.23023E+00 | -2.39596E+01 | -9.12600E+00 |
| A4 = | 6.05174E-02 | -4.60913E-02 | -2.35455E-01 | -1.58938E-01 | -3.39372E-01 | -1.54518E-01 |
| A6 = | 6.32966E-02 | -7.95392E-02 | 9.93158E-01 | 1.19838E+00 | 2.93239E-01 | 5.83741E-02 |
| A8 = | -1.16791E-01 | -2.37520E-01 | 3.32063E-01 | -4.15712E-02 | -2.82365E-01 | -4.29355E-02 |
| A10= | 1.74001E-01 | -2.31988E-01 | -3.15362E+00 | 1.99549E-01 | 1.59572E-01 | 1.15308E-02 |
| A12 = | 1.53275E-02 | -1.78113E-03 | -6.82700E-03 | 4.26136E-03 | -2.83804E-02 | 2.05565E-06 |
| A14= | -2.52416E-03 | -1.28159E-02 | -2.89747E-02 | 3.21692E-03 | -5.52514E-03 | -8.16789E-04 |
| A16= | 3.47723E-03 | -1.99507E-03 | 2.02012E-02 | 9.69081E-03 | 5.35253E-03 | 7.88135E-05 |

Fig.12

| TABLE 9 | | | | |
|---|---|---|---|---|
| | Embodiment 1 | Embodiment 2 | Embodiment 3 | Embodiment 4 |
| f | 2.84 | 2.20 | 2.55 | 2.75 |
| Fno | 2.03 | 2.87 | 2.80 | 2.45 |
| HFOV | 31.8 | 33.2 | 34.1 | 32.3 |
| V1-V2 | 32.5 | 32.5 | 32.5 | 34.5 |
| T12/T23 | 0.93 | 0.86 | 1.30 | 0.98 |
| R1/R2 | 0.07 | 0.45 | 0.19 | 0.21 |
| R3/f | -0.32 | -0.54 | -0.43 | -0.39 |
| f/f1 | 1.24 | 1.35 | 1.14 | 1.25 |
| f/f2 | -0.35 | -0.36 | -0.25 | -0.37 |
| |f/f3| | 0.05 | 0.36 | 0.18 | 0.12 |
| |SAG21/Y21| | 0.31 | 0.29 | 0.29 | 0.29 |
| |SAG22/Y22| | 0.15 | 0.15 | 0.15 | 0.15 |
| SL/TTL | 0.94 | 0.94 | 0.97 | 0.97 |
| TTL/ImgH | 1.87 | 1.56 | 1.59 | 1.76 |

Fig.13

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 099130290 filed in Taiwan, R.O.C. on Sep. 8, 2010, the entire contents of which are hereby incorporated by reference.

BACKGROUND OF THE INVENTION

1. Field of the Invention

The present invention relates to a photographing optical lens assembly, and more particularly, to a compact photographing optical lens assembly used in an electronic product.

2. Description of the Prior Art

In recent years, due to the popularity of portable electronic products with photographing functions, the demand for compact imaging lens system is increasing, and the sensor of a general photographing camera is none other than CCD (Charge-coupled Device) or CMOS device (Complementary Metal-oxide-semiconductor Device). Furthermore, as advances in semiconductor manufacturing technology have allowed the pixel size of sensors to be reduced, and the resolution of compact imaging lens system has gradually increased, there is an increasing demand for compact imaging lens system featuring better image quality.

A conventional compact imaging lens generally comprises two lens elements so as to reduce the production cost, such as the imaging lens disclosed in U.S. Pat. No. 7,525,741. As the two-element lens has limited capability to correct aberrations, it became insufficient for a high-end photographing module. However, employing excess number of lens elements will make it difficult to reduce the total track length of the lens.

To obtain good image quality and maintain a compact form, a photographing optical lens assembly comprising three lens elements is a feasible solution. The optical lens system for taking images disclosed in U.S. Pat. No. 7,436,603 is of a triplet type comprising, in order from the object side to the image side: a first lens element with positive refractive power, a second lens element with negative refractive power, and a third lens element with positive refractive power. Although the arrangement facilitates the correction of most of the aberrations caused by the optical system, it requires a longer total track length, and thus, the size of the optical lens system for taking images must increase to accommodate the lengthened total track length. Consequently, the optical lens system for taking images is unable to maintain a compact form.

Therefore, a need exists in the art for a photographing optical lens assembly that features better image quality, and maintains a moderate total track length for compact, portable electronic products.

SUMMARY OF THE INVENTION

The present invention provides a photographing optical lens assembly comprising, in order from an object side to an image side: a first lens element with positive refractive power having a convex object-side surface and a concave image-side surface; a second lens element with negative refractive power having a concave object-side surface and a convex image-side surface, the object-side and image-side surfaces thereof being aspheric; a third lens element with negative refractive power having a convex object-side surface and a concave image-side surface, the object-side and image-side surfaces thereof being aspheric, and at least one inflection point being formed on the image-side surface, wherein the lens assembly is further provided with a stop disposed between the object and the first lens element and an electronic sensor disposed at an image plane for image formation of an object; a distance on an optical axis between the first lens element and the second lens element is T$12$; a distance on the optical axis between the second lens element and the third lens element is T$23$; a focal length of the lens assembly is f; a focal length of the second lens element is f$2$; a radius of curvature of the object-side surface of the first lens element is R$1$; a radius of curvature of the image-side surface of the first lens element is R$2$; a radius of curvature of the object-side surface of the second lens element is R$3$; a vertex of the image-side surface of the second lens element on the optical axis is T$2$; when an image height of the system is half of a diagonal length of an effective pixel area of the electronic sensor, a farthest point of an effective light entry area on the image-side surface of the second lens element is P$2$; a distance on the optical axis between T$2$ and a vertical projection of P$2$ on the optical axis is SAG$22$ (the direction towards the object is defined as negative, and the direction towards the image is defined as positive); a distance between P$2$ and its vertical projection on the optical axis is Y$22$; a vertex of the object-side surface of the second lens element on the optical axis is T$1$; when the image height of the system is half of the diagonal length of the effective pixel area of the electronic sensor, a farthest point of the effective light entry area on the object-side surface of the second lens element is P$1$; a distance on the optical axis between T$1$ and a vertical projection of P$1$ on the optical axis is SAG$21$ (the direction towards the object is defined as negative, and the direction towards the image is defined as positive); a distance between P$1$ and its vertical projection on the optical axis is Y$21$; a distance on the optical axis between the stop and the electronic sensor is SL; a distance on the optical axis between the object-side surface of the first lens element and the electronic sensor is TTL; they satisfy the following relations: $0.35<T12/T23<1.95$; $-0.50<f/f2<-0.10$; $0.00<R1/R2<0.32$; $-0.65<R3/f<-0.30$; $|SAG21/Y21|<0.33$; $|SAG22/Y22|<0.23$; and $0.90<SL/TTL<1.07$.

Moreover, the present invention provides a photographing optical lens assembly comprising, in order from an object side to an image side: a first lens element with positive refractive power having a convex object-side surface and a concave image-side surface, the object-side and image-side surfaces thereof being aspheric; a second lens element with negative refractive power having a concave object-side surface and a convex image-side surface, the object-side and image-side surfaces thereof being aspheric; and a third lens element with negative refractive power having a convex object-side surface and a concave image-side surface, the object-side and image-side surfaces thereof being aspheric and at least one inflection point being formed on the image-side surface, wherein the lens assembly is further provided with a stop disposed between the object and the first lens element, and an electronic sensor disposed at an image plane for image formation of an object; a distance on an optical axis between the first lens element and the second lens element is T$12$; a distance on the optical axis between the second lens element and the third lens element is T$23$; a focal length of the lens assembly is f; a focal length of the second lens element is f$2$; a radius of curvature of the object-side surface of the second lens element is R$3$; an Abbe number of the first lens element is V$1$; an Abbe number of the second lens element is V$2$; a distance on the optical axis between the stop and the electronic sensor is SL; a distance on the optical axis between the object-side surface of the first lens element and the electronic sensor is TTL; they satisfy the following relations: 0.60<T12/T23<1.65; −0.50<f/f2<−0.10; −0.65<R3/f<−0.30; 32.0<V1−V2<42.0; and 0.90<SL/TTL<1.07.

Such arrangement of optical elements can effectively reduce the total track length of the lens assembly, lower the sensitivity of the optical system, and obtain good image quality.

In a photographing optical lens assembly of the present invention, the first lens element with positive refractive power provides the main refractive power of the system; this allows the total track length of the lens assembly to be favorably reduced. The second lens element has negative refractive power; this allows aberrations produced by the first lens element, as well as chromatic aberrations of the system, to be effectively corrected. The third lens element has negative refractive power; this allows the principal point of the optical system to be placed away from the image plane, thereby reducing the total track length of the system favorably and minimizing the lens assembly.

In a photographing optical lens assembly of the present invention, the first lens element is a meniscus lens element having a convex object-side surface and a concave image-side surface; this allows astigmatisms of the lens assembly to be favorably corrected, thereby improving the image quality. The second lens element is a meniscus lens element having a concave object-side surface and a convex image-side surface; this allows the aberration produced by the first lens element, as well as astigmatisms of the system, to be favorably corrected, thereby reducing the sensitivity of the lens assembly. The third lens element is a meniscus lens element having a convex object-side surface and a concave image-side surface; this allows astigmatisms and high-order aberrations of the system to be favorably corrected.

In a photographing optical lens assembly of the present invention, the stop is disposed between the object and the first lens element. With the first lens element providing positive refractive power and by placing the stop near the object, the total track length of the lens assembly can be effectively reduced. The aforementioned arrangement also enables the exit pupil of the lens assembly to be positioned far away from the image plane; thus, light will be projected onto the electronic sensor at a nearly perpendicular angle, and this is the telecentric feature of the image side. The telecentric feature is very important to the photosensitive ability of the current solid-state sensor because it can improve the photosensitivity of the sensor to reduce the probability of the occurrence of shading. Moreover, the third lens element can be provided with an inflection point; as a result, the angle at which light is projected onto the sensor from the off-axis field can be effectively reduced, thereby further correcting the off-axis aberrations. Therefore, in a photographing optical lens assembly of the present invention, by placing the stop between the object and the first lens element, the telecentricity of the system can be maintained, and the total track length of the lens assembly can be further reduced in order to remain compact in size.

BRIEF DESCRIPTION OF THE DRAWINGS

FIG. 5 is TABLE 1 which lists the optical data of the first embodiment.

FIG. 6 is TABLE 2 which lists the aspheric surface data of the first embodiment.

FIG. 7 is TABLE 3 which lists the optical data of the second embodiment.

FIG. 8 is TABLE 4 which lists the aspheric surface data of the second embodiment.

FIG. 9 is TABLE 5 which lists the optical data of the third embodiment.

FIG. 10 is TABLE 6 which lists the aspheric surface data of the third embodiment.

FIG. 11 is TABLE 7 which lists the optical data of the fourth embodiment.

FIG. 12 is TABLE 8 which lists the aspheric surface data of the fourth embodiment.

FIG. 13 is TABLE 9 which lists the data of the respective embodiments resulting from the equations.

DETAILED DESCRIPTION OF THE PREFERRED EMBODIMENTS

The present invention provides a photographing optical lens assembly comprising, in order from an object side to an image side: a first lens element with positive refractive power having a convex object-side surface and a concave image-side surface; a second lens element with negative refractive power having a concave object-side surface and a convex image-side surface, the object-side and image-side surfaces thereof being aspheric; a third lens element with negative refractive power having a convex object-side surface and a concave image-side surface, the object-side and image-side surfaces thereof being aspheric and at least one inflection point being formed on the image-side surface, wherein the lens assembly is further provided with a stop disposed between the object and the first lens element, and an electronic sensor disposed at an image plane for image formation of an object; a distance on an optical axis between the first lens element and the second lens element is T12; a distance on the optical axis between the second lens element and the third lens element is T23; a focal length of the lens assembly is f; a focal length of the second lens element is f2; a radius of curvature of the object-side surface of the first lens element is R1; a radius of curvature of the image-side surface of the first lens element is R2; a radius of curvature of the object-side surface of the second lens element is R3.

Figure 14:
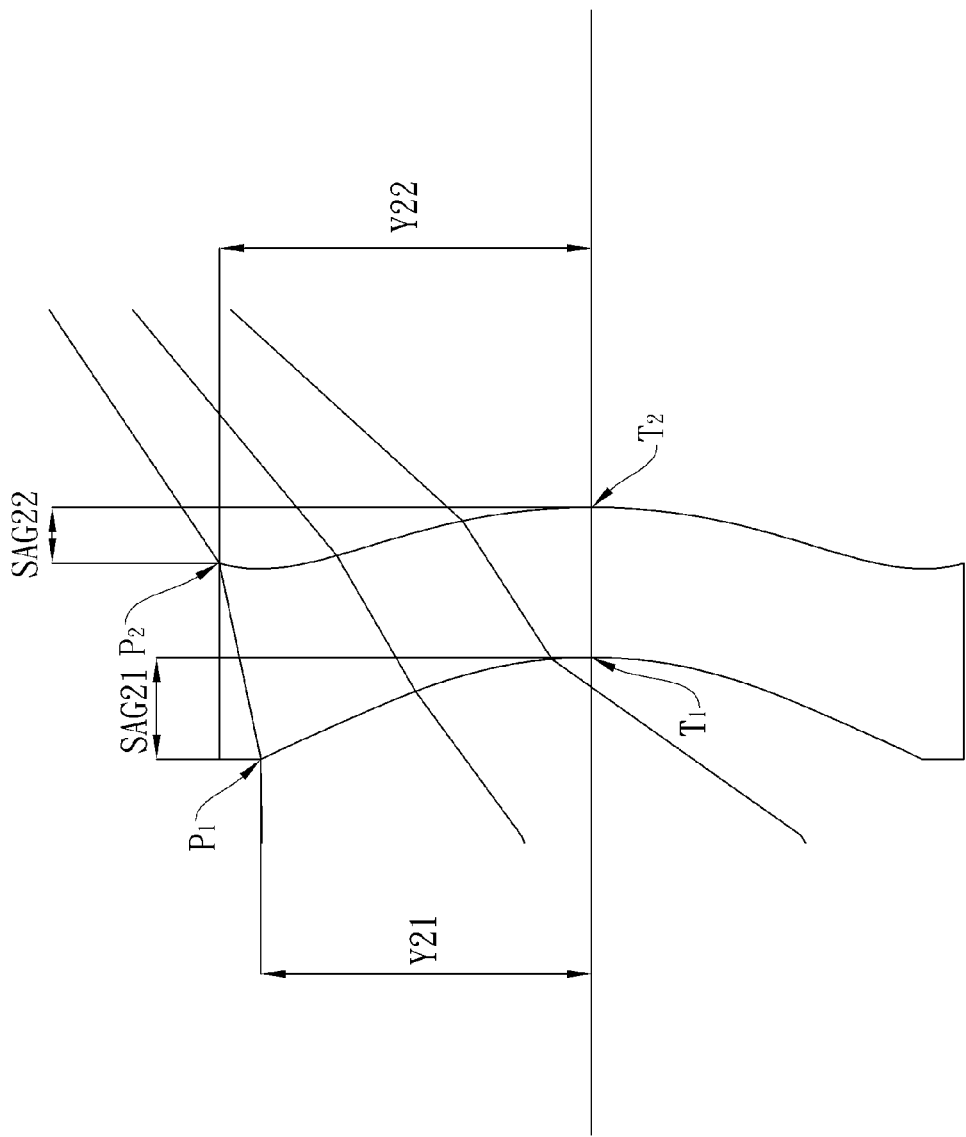
FIG. 14 is a schematic view illustrating the relative positions of T1, T2, P1, and P2, and the distances that Y21, SAG21, Y22, and SAG22 represent.

FIG. 14 is a schematic view illustrating the relative positions of T1, T2, P1, and P2, and the distances that Y21, SAG21, Y22, and SAG22 represent, the details of which will be described below. T2 is a vertex of the image-side surface of the second lens element on the optical axis; when an image height of the system is half of a diagonal length of an effective pixel area of the electronic sensor, a farthest point of an effective light entry area on the image-side surface of the second lens element is P2; a distance on the optical axis between T2 and a vertical projection of P2 on the optical axis is SAG22; and a distance between P2 and its vertical projection on the optical axis is Y22. Moreover, T1 is a vertex of the object-side surface of the second lens element on the optical axis; when the image height of the system is half of the diagonal length of the effective pixel area of the electronic sensor, a farthest point of the effective light entry area on the object-side surface of the second lens element is P1; a distance on the optical axis between T1 and a vertical projection of P1 on the optical axis is SAG21; and a distance between P1 and its vertical projection on the optical axis is Y21. A distance on the optical axis between the stop and the electronic sensor is SL; a distance on the optical axis between the object-side surface of the first lens element and the electronic sensor is TTL. And the following relations are satisfied: $0.35<T12/T23<1.95$; $-0.50<f/f2<-0.10$; $0.00<R1/R2<0.32$; $-0.65<R3/f<-0.30$; $|SAG21/Y21|<0.33$; $|SAG22/Y22|<0.23$; $0.90<SL/TTL<1.07$.

When the relation of $0.35<T12/T23<1.95$ is satisfied, the spacing between every two lens elements is more appropriate, which is favorable for the assembling and arrangement of the lens elements, and also favorable for a more efficient use of the space within the lens assembly, thereby keeping the lens assembly compact; preferably, the following relation is satisfied: $0.60<T12/T23<1.65$. When the relation of $-0.50<f/f2<-0.10$ is satisfied, the refractive power of the second lens element is more appropriate. This feature allows aberrations produced by the first lens element to be corrected favorably while preventing the refractive power of the second lens element from becoming too large, so that the sensitivity of the system can be favorably reduced; preferably, the following relation is satisfied: $-0.38<f/f2<-0.18$. When the relation of $0.00<R1/R2<0.32$ is satisfied, spherical aberrations of the system can be favorably corrected; preferably, the following relation is satisfied: $0.00<R1/R2<0.20$. When the relation of $-0.65<R3/f<-0.30$ is satisfied, the back focal length of the system can be extended favorably so that there will be sufficient space to accommodate other components in the lens assembly. When the relations of $|SAG21/Y21|<0.33$ and $|SAG22/Y22|<0.23$ are satisfied, the second lens element can have a more moderate shape that is not excessively curved. This feature is favorable for the formation and manufacturing of the lens elements, reducing the space needed for allocating the lens elements, and allowing more compact arrangement of lens elements; preferably, the following relation is satisfied: $|SAG22/Y22|<0.18$. When the relation of $0.90<SL/TTL<1.07$ is satisfied, the telecentricity of the lens assembly can be favorably maintained, thereby further reducing the total track length of the lens assembly.

In the aforementioned photographing optical lens assembly, the focal length of the lens assembly is f, the focal length of the first lens element is f1, and preferably, they satisfy the following relation: $0.80<f/f1<1.45$. When this relation is satisfied, the refractive power of the first lens element can be distributed in a more balanced degree; this allows the total track length of the system to be effectively controlled in order to remain compact and prevent high order spherical aberrations from increasing excessively while improving image quality of the system. Further preferably, the following relation is satisfied: $1.00<f/f1<1.25$.

In the aforementioned photographing optical lens assembly, an Abbe number of the first lens element is V1, an Abbe number of the second lens element is V2, and preferably, they satisfy the following relation: $32.0<V1-V2<42.0$. When this relation is satisfied, chromatic aberrations of the lens assembly can be favorably corrected.

In the aforementioned photographing optical lens assembly, the focal length of the lens assembly is f, a focal length of the third lens element is f3, and preferably, they satisfy the following relation: $|f/f3|<0.20$. When this relation is satisfied, the third lens element can function as a corrective lens element; as a result, astigmatisms and distortions of the system can be favorably corrected for increasing the resolution of the lens assembly.

In the aforementioned photographing optical lens assembly, the distance on the optical axis between the object-side surface of the first lens element and the electronic sensor is TTL, half of the diagonal length of the effective pixel area of the electronic sensor is ImgH, and preferably, they satisfy the following relation: $TTL/ImgH<1.80$. When this relation is satisfied, the lens assembly can maintain a compact size which is favorable for the installation into a compact electronic product. Further preferably, the following relation is satisfied: $TTL/ImgH<1.65$.

Moreover, the present invention provides a photographing optical lens assembly comprising, in order from an object side to an image side: a first lens element with positive refractive power having a convex object-side surface and a concave image-side surface, the object-side and image-side surfaces thereof being aspheric; a second lens element with negative refractive power having a concave object-side surface and a convex image-side surface, the object-side and image-side surfaces thereof being aspheric; a third lens element with negative refractive power having a convex object-side surface and a concave image-side surface, the object-side and image-side surfaces thereof being aspheric and at least one inflection point being formed on the image-side surface, wherein the lens assembly is further provided with an electronic sensor disposed at an image plane for image formation of an object and provided with a stop disposed between the object and the first lens element; a distance on an optical axis between the first lens element and the second lens element is T12; a distance on the optical axis between the second lens element and the third lens element is T23; a focal length of the lens assembly is f; a focal length of the second lens element is f2; a radius of curvature of the object-side surface of the second lens element is R3; an Abbe number of the first lens element is V1; an Abbe number of the second lens element is V2; a distance on the optical axis between the stop and the electronic sensor is SL; a distance on the optical axis between the object-side surface of the first lens element and the electronic sensor is TTL; and they satisfy the following relations: $0.60<T12/T23<1.65$; $-0.50<f/f2<-0.10$; $-0.65<R3/f<-0.30$; $32.0<V1-V2<42.0$; and $0.90<SL/TTL<1.07$.

When the relation of $0.60<T12/T23<1.65$ is satisfied, the spacing between every two lens elements is more appropriate, which is favorable for the assembling and arrangement of the lens elements, and more efficient use of the space within the lens assembly for keeping it compact. When the relation of $-0.50<f/f2<-0.10$ is satisfied, the refractive power of the second lens element is more appropriate. This feature allows aberrations produced by the first lens element to be corrected favorably and prevents the refractive power of the second lens element from becoming too large, so that the sensitivity of the system can be favorably reduced; preferably, the following relation is satisfied: $-0.38<f/f2<-0.18$. When the relation of $-0.65<R3/f<-0.30$ is satisfied, the back focal length of the system can be extended favorably, so that there will be sufficient space to accommodate other components in the lens assembly. When the relation of $32.0<V1-V2<42.0$ is satisfied, chromatic aberrations of the lens assembly can be favorably corrected. When the relation of 0.90<SL/TTL<1.07 is satisfied, the telecentricity of the lens assembly can be favorably maintained, thereby further reducing the total track length of the lens assembly.

In the aforementioned photographing optical lens assembly, the Abbe number of the second lens element is V2, and preferably, it satisfies the following relation: V2<24.0. When this relation is satisfied, chromatic aberrations of the lens assembly can be favorably corrected.

In the aforementioned photographing optical lens assembly, a radius of curvature of the object-side surface of the first lens element is R1, a radius of curvature of the image-side surface of the first lens element is R2, and preferably, they satisfy the following relation: 0.00<R1/R2<0.20. When this relation is satisfied, spherical aberrations of the system can be favorably corrected.

In the aforementioned photographing optical lens assembly, the distance on the optical axis between the object-side surface of the first lens element and the electronic sensor is TTL, half of the diagonal length of the effective pixel area of the electronic sensor is ImgH, and preferably, they satisfy the following relation: TTL/ImgH<1.65. When this relation is satisfied, the lens assembly can maintain a compact size which is favorable for the installation into a compact electronic product.

In a photographing optical lens assembly of the present invention, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the total number of the lens elements, so that the total track length of the lens assembly can be reduced effectively.

In a photographing optical lens assembly of the present invention, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1A:
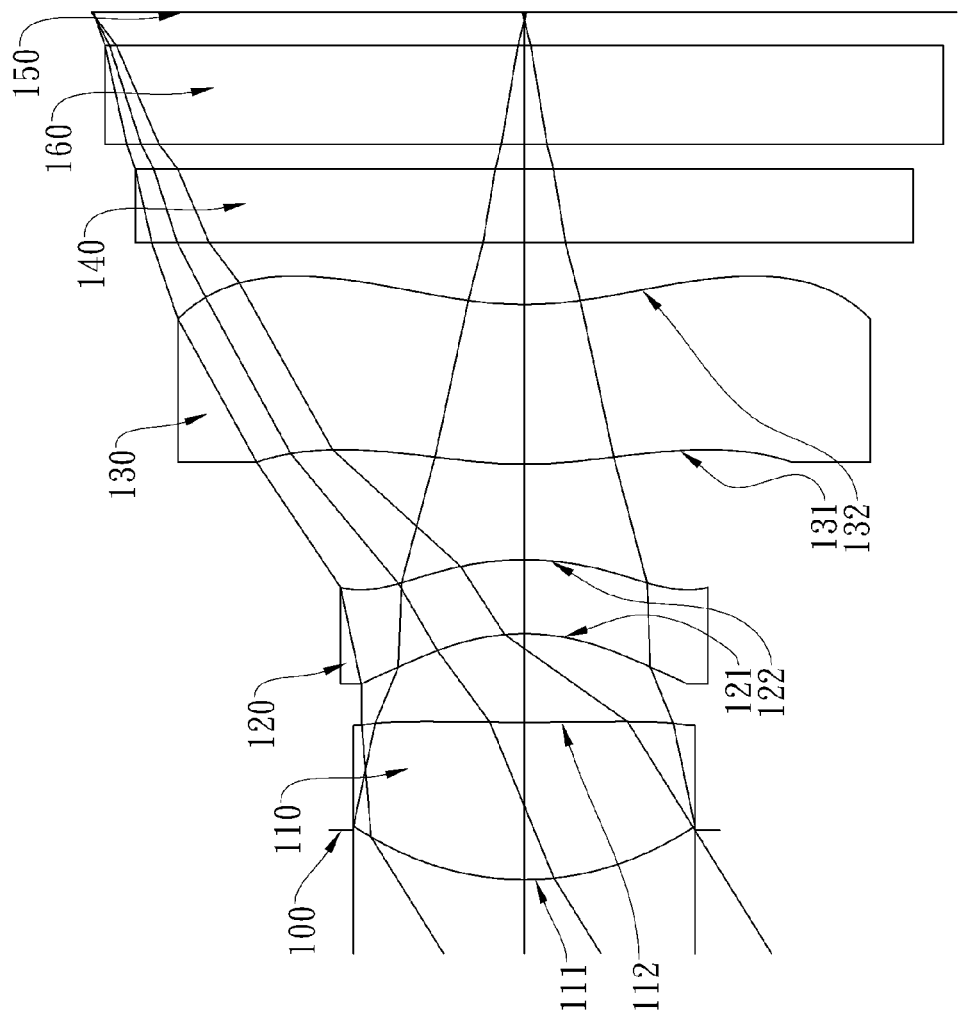
FIG. 1A shows a photographing optical lens assembly in accordance with a first embodiment of the present invention.
Figure 1B:
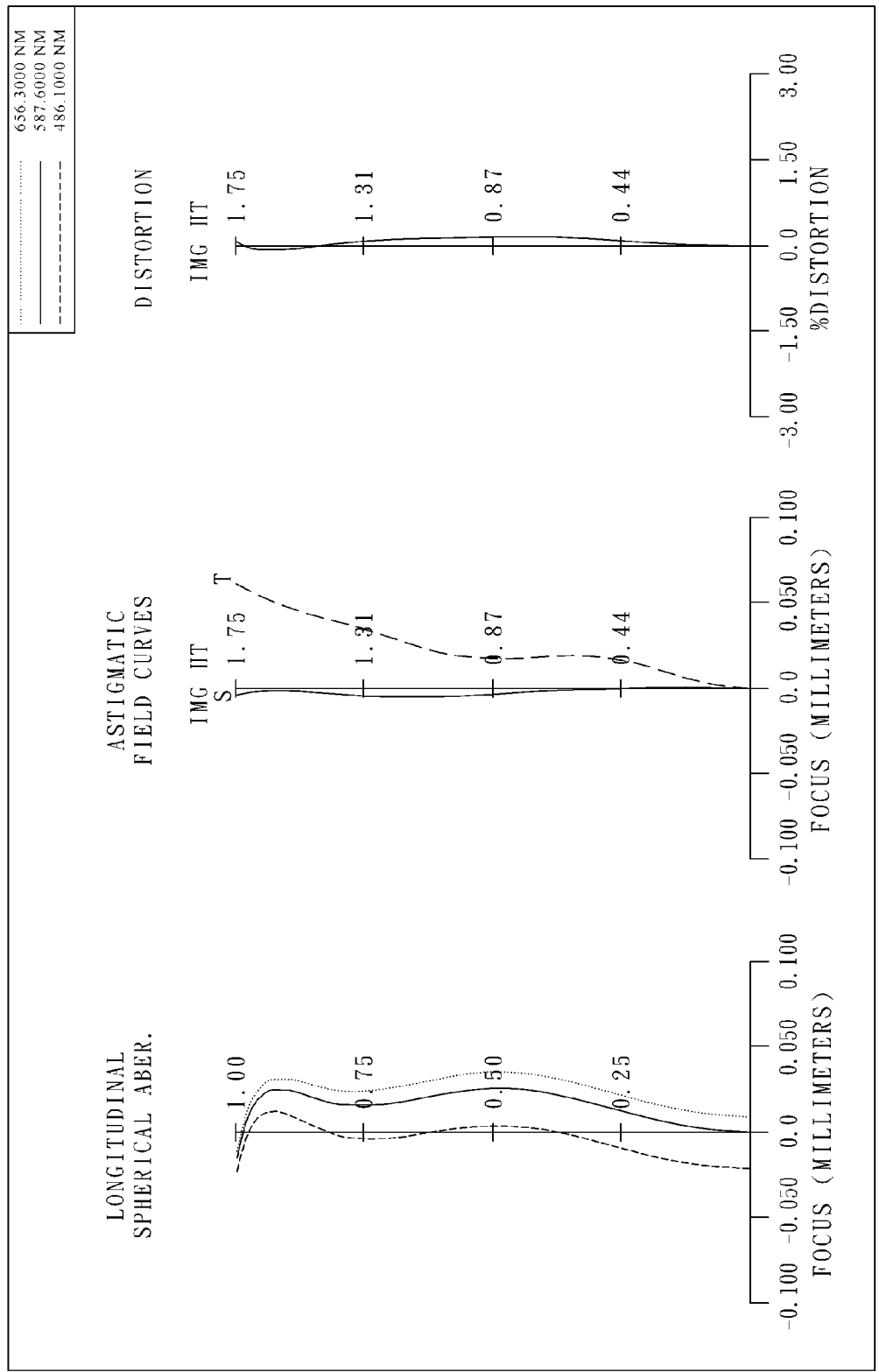
FIG. 1B shows the aberration curves of the first embodiment of the present invention.

FIG. 1A shows a photographing optical lens assembly in accordance with a first embodiment of the present invention, and FIG. 1B shows the aberration curves of the first embodiment of the present invention. The photographing optical lens assembly in the first embodiment mainly comprises three lens elements, in order from an object side to an image side: a plastic first lens element 110 with positive refractive power having a convex object-side surface 111 and a concave image-side surface 112, both of the surfaces 111 and 112 being aspheric; a plastic second lens element 120 with negative refractive power having a concave object-side surface 121 and a convex image-side surface 122, both of the surfaces 121 and 122 being aspheric; and a plastic third lens element 130 with negative refractive power having a convex object-side surface 131 and a concave image-side surface 132, both of the surfaces 131 and 132 being aspheric and at least one inflection point being formed on the image-side surface 132. The lens assembly is also provided with a stop 100 disposed between an object and the first lens element 110. The photographing optical lens assembly further comprises an IR-filter 140 disposed between the image-side surface 132 of the third lens element 130 and an image plane 150, as well as a cover glass 160 between the IR-filter 140 and the image plane 150. The IR-filter 140 is made of glass and has no influence on the focal length of the photographing optical lens assembly.

The equation of the aspheric surface profiles is expressed as follows:

$$X(Y) = (Y^2/R)/(1+sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical lens assembly, the focal length of the lens assembly is f, and it satisfies the relation: f=2.84 (mm).

In the first embodiment of the present photographing optical lens assembly, the f-number of the lens assembly is Fno, and it satisfies the relation: Fno=2.03.

In the first embodiment of the present photographing optical lens assembly, half of the maximum field of view of the lens assembly is HFOV, and it satisfies the relation: HFOV=31.8 (degrees).

In the first embodiment of the present photographing optical lens assembly, the Abbe number of the first lens element 110 is V1, the Abbe number of the second lens element 120 is V2, and they satisfy the relation: V1−V2=32.5.

In the first embodiment of the present photographing optical lens assembly, the distance on the optical axis between the first lens element 110 and the second lens element 120 is T12, the distance on the optical axis between the second lens element 120 and the third lens element 130 is T23, and they satisfy the relation: T12/T23=0.93.

In the first embodiment of the present photographing optical lens assembly, the radius of curvature of the object-side surface 111 of the first lens element 110 is R1, the radius of curvature of the image-side surface 112 of the first lens element 110 is R2, and they satisfy the relation: R1/R2=0.07.

In the first embodiment of the present photographing optical lens assembly, the radius of curvature of the object-side surface 121 of the second lens element 120 is R3, the focal length of the lens assembly is f, and they satisfy the relation: R3/f=−0.32.

In the first embodiment of the present photographing optical lens assembly, the focal length of the lens assembly is f, the focal length of the first lens element 110 is f1, and they satisfy the relation: f/f1=1.24.

In the first embodiment of the present photographing optical lens assembly, the focal length of the lens assembly is f, the focal length of the second lens element 120 is f2, and they satisfy the relation: f/f2=−0.35.

In the first embodiment of the present photographing optical lens assembly, the focal length of the lens assembly is f, the focal length of the third lens element 130 is f3, and they satisfy the relation: |f/f3|=0.05.

In the first embodiment of the present photographing optical lens assembly, an electronic sensor is disposed at the image plane 150 for image formation of the object; the vertex of the object-side surface 121 of the second lens element 120 on the optical axis is T1; when the image height of the system is half of the diagonal length of the effective pixel area of the electronic sensor, the farthest point of the effective light entry area on the object-side surface 121 of the second lens element 120 is P1; the distance on the optical axis between T1 and the vertical projection of P1 on the optical axis is SAG21; the distance between P1 and its vertical projection on the optical axis is Y21; and they satisfy the relation: |SAG21/Y21|=0.31.

In the first embodiment of the present photographing optical lens assembly, the vertex of the image-side surface 122 of the second lens element 120 on the optical axis is T2; when the image height of the system is half of the diagonal length of the effective pixel area of the electronic sensor, the farthest point of the effective light entry area on the image-side surface 122 of the second lens element 120 is P2; the distance on the optical axis between T2 and the vertical projection of P2 on the optical axis is SAG22; the distance between P2 and its vertical projection on the optical axis is Y22; and they satisfy the relation: |SAG22/Y22|=0.15.

In the first embodiment of the present photographing optical lens assembly, the distance on the optical axis between the stop 100 and the electronic sensor is SL, the distance on the optical axis between the object-side surface 111 of the first lens element 110 and the electronic sensor is TTL, and they satisfy the relation: SL/TTL=0.94.

In the first embodiment of the present photographing optical lens assembly, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=1.87.

The detailed optical data of the first embodiment is shown in FIG. 5 (TABLE 1), and the aspheric surface data is shown in FIG. 6 (TABLE 2), wherein the units of the radius of curvature, the thickness and the focal length are expressed in mm, and HFOV is half of the maximum field of view.

Figure 2A:
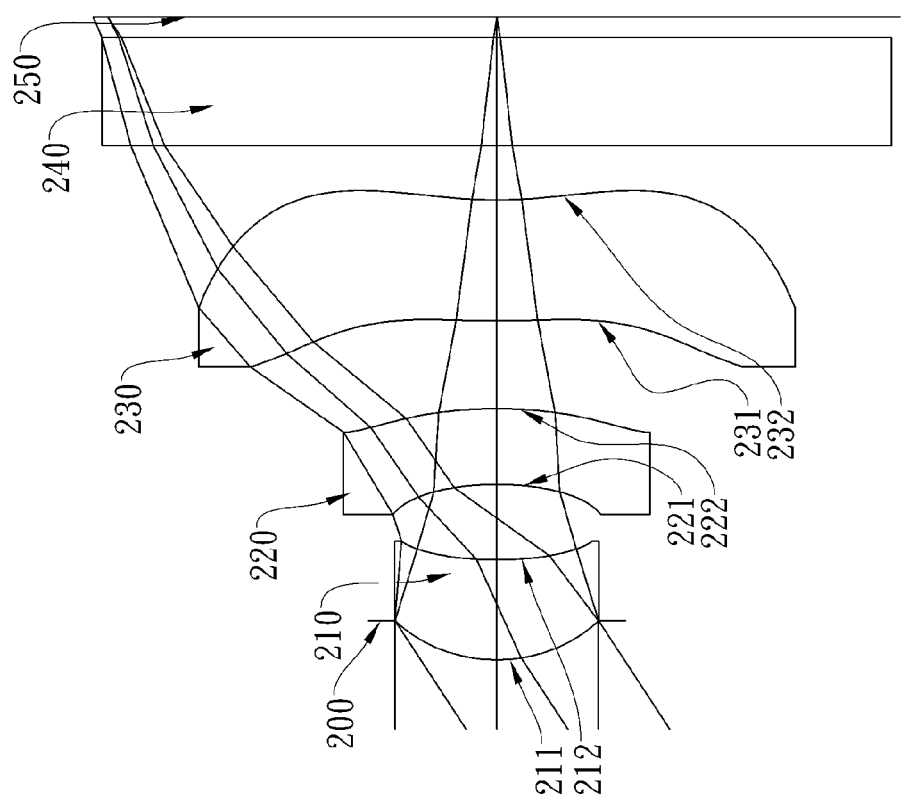
FIG. 2A shows a photographing optical lens assembly in accordance with a second embodiment of the present invention.
Figure 2B:
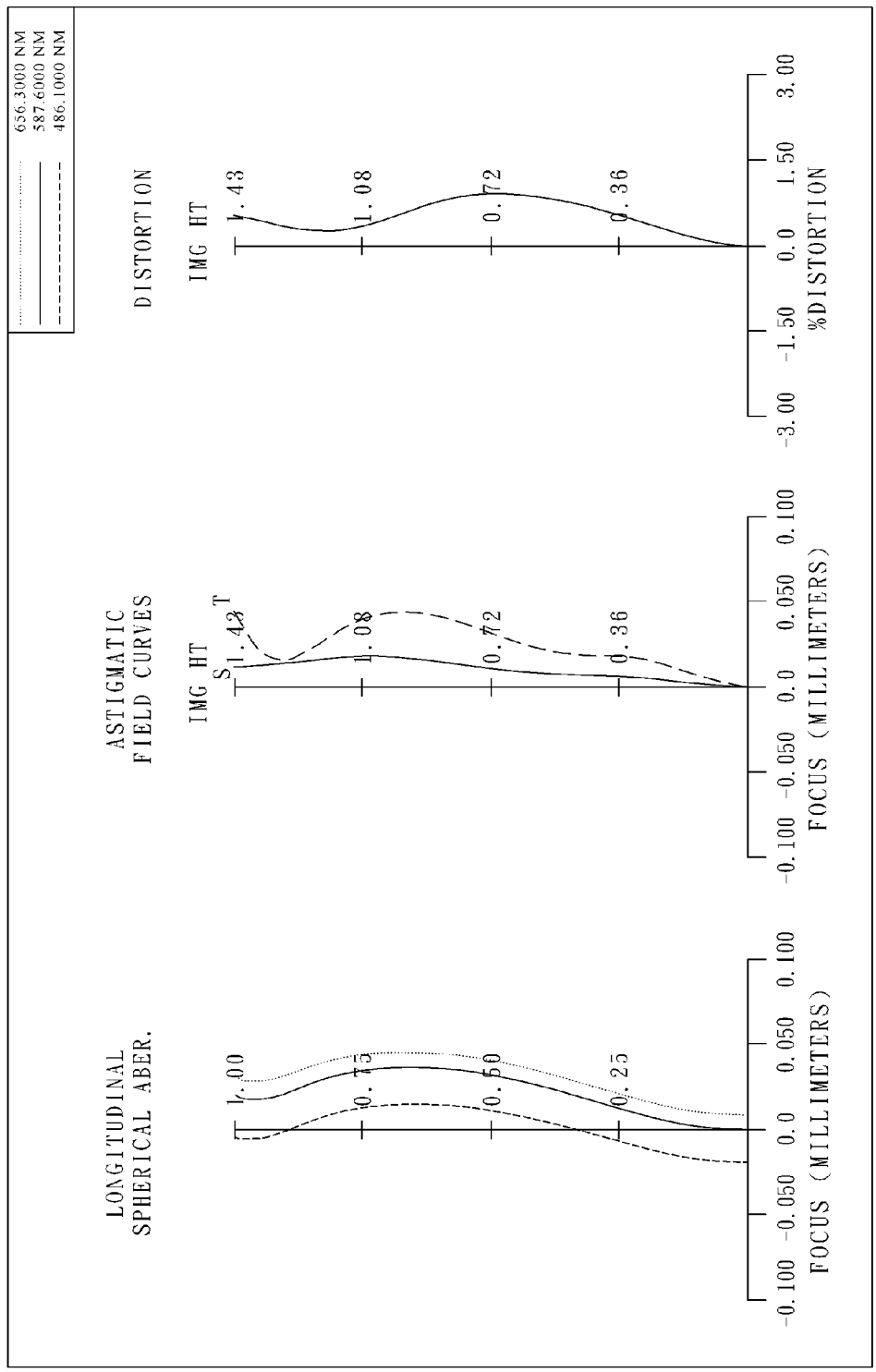
FIG. 2B shows the aberration curves of the second embodiment of the present invention.

FIG. 2A shows a photographing optical lens assembly in accordance with a second embodiment of the present invention, and FIG. 2B shows the aberration curves of the second embodiment of the present invention. The photographing optical lens assembly in the second embodiment mainly comprises three lens elements, in order from an object side to an image side: a plastic first lens element 210 with positive refractive power having a convex object-side surface 211 and a concave image-side surface 212, both of the surfaces 211 and 212 being aspheric; a plastic second lens element 220 with negative refractive power having a concave object-side surface 221 and a convex image-side surface 222, both of the surfaces 221 and 222 being aspheric; a plastic third lens element 230 with negative refractive power having a convex object-side surface 231 and a concave image-side surface 232, both of the surfaces 231 and 232 being aspheric and at least one inflection point being formed on the image-side surface 232. The lens assembly is also provided with a stop 200 disposed between an object and the first lens element 210. The photographing optical lens assembly further comprises an IR-filter 240 disposed between the image-side surface 232 of the third lens element 230 and an image plane 250. The IR-filter 240 is made of glass and has no influence on the focal length of the photographing optical lens assembly.

The equation of the aspheric surface profiles of the second embodiment has the same form as that of the first embodiment.

In the second embodiment of the present photographing optical lens assembly, the focal length of the lens assembly is f, and it satisfies the relation: f=2.20 (mm).

In the second embodiment of the present photographing optical lens assembly, the f-number of the lens assembly is Fno, and it satisfies the relation: Fno=2.87.

In the second embodiment of the present photographing optical lens assembly, half of the maximum field of view of the lens assembly is HFOV, and it satisfies the relation: HFOV=33.2 (degrees).

In the second embodiment of the present photographing optical lens assembly, the Abbe number of the first lens element 210 is V1, the Abbe number of the second lens element 220 is V2, and they satisfy the relation: V1−V2=32.5.

In the second embodiment of the present photographing optical lens assembly, the distance on the optical axis between the first lens element 210 and the second lens element 220 is T12, the distance on the optical axis between the second lens element 220 and the third lens element 230 is T23, and they satisfy the relation: T12/T23=0.86.

In the second embodiment of the present photographing optical lens assembly, the radius of curvature of the object-side surface 211 of the first lens element 210 is R1, the radius of curvature of the image-side surface 212 of the first lens element 210 is R2, and they satisfy the relation: R1/R2=0.45.

In the second embodiment of the present photographing optical lens assembly, the radius of curvature of the object-side surface 221 of the second lens element 220 is R3, the focal length of the lens assembly is f, and they satisfy the relation: R3/f=−0.54.

In the second embodiment of the present photographing optical lens assembly, the focal length of the lens assembly is f, the focal length of the first lens element 210 is f1, and they satisfy the relation: f/f1=1.35.

In the second embodiment of the present photographing optical lens assembly, the focal length of the lens assembly is f, the focal length of the second lens element 220 is f2, and they satisfy the relation: f/f2=−0.36.

In the second embodiment of the present photographing optical lens assembly, the focal length of the lens assembly is f, the focal length of the third lens element 230 is f3, and they satisfy the relation: |f/f3|=0.36.

In the second embodiment of the present photographing optical lens assembly, an electronic sensor is disposed at the image plane 250 for image formation of the object; the vertex of the object-side surface 221 of the second lens element 220 on the optical axis is T1; when the image height of the system is half of the diagonal length of the effective pixel area of the electronic sensor, the farthest point of the effective light entry area on the object-side surface 221 of the second lens element 220 is P1; the distance on the optical axis between T1 and the vertical projection of P1 on the optical axis is SAG21; the distance between P1 and its vertical projection on the optical axis is Y21; and they satisfy the relation: |SAG21/Y21|=0.29.

In the second embodiment of the present photographing optical lens assembly, the vertex of the image-side surface 222 of the second lens element 220 on the optical axis is T2; when the image height of the system is half of the diagonal length of the effective pixel area of the electronic sensor, the farthest point of the effective light entry area on the image-side surface 222 of the second lens element 220 is P2; the distance on the optical axis between T2 and the vertical projection of P2 on the optical axis is SAG22; the distance between P2 and its vertical projection on the optical axis is Y22; and they satisfy the relation: |SAG22/Y22|=0.15.

In the second embodiment of the present photographing optical lens assembly, the distance on the optical axis between the stop 200 and the electronic sensor is SL, the distance on the optical axis between the object-side surface 211 of the first lens element 210 and the electronic sensor is TTL, and they satisfy the relation: SL/TTL=0.94.

In the second embodiment of the present photographing optical lens assembly, the distance on the optical axis between the object-side surface 211 of the first lens element 210 and the electronic sensor is TTL, half of the diagonal length of the effective pixel area of the electronic sensor is ImgH, and they satisfy the relation: TTL/ImgH=1.56.

The detailed optical data of the second embodiment is shown in FIG. 7 (TABLE 3), and the aspheric surface data is shown in FIG. 8 (TABLE 4), wherein the units of the radius of curvature, the thickness and the focal length are expressed in mm, and HFOV is half of the maximum field of view.

Figure 3A:
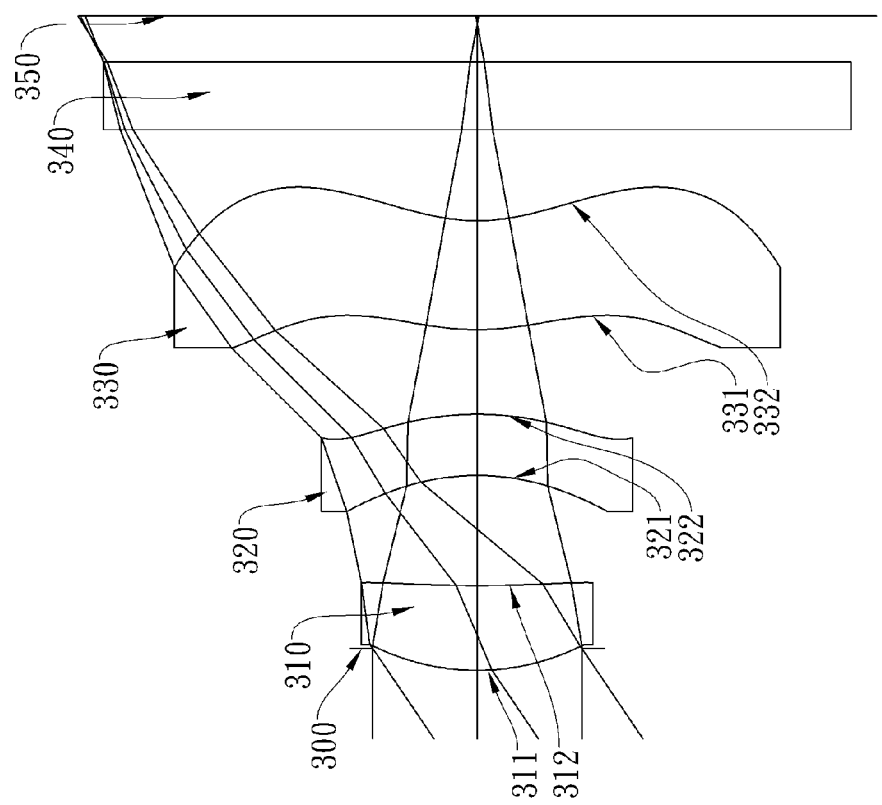
FIG. 3A shows a photographing optical lens assembly in accordance with a third embodiment of the present invention.
Figure 3B:
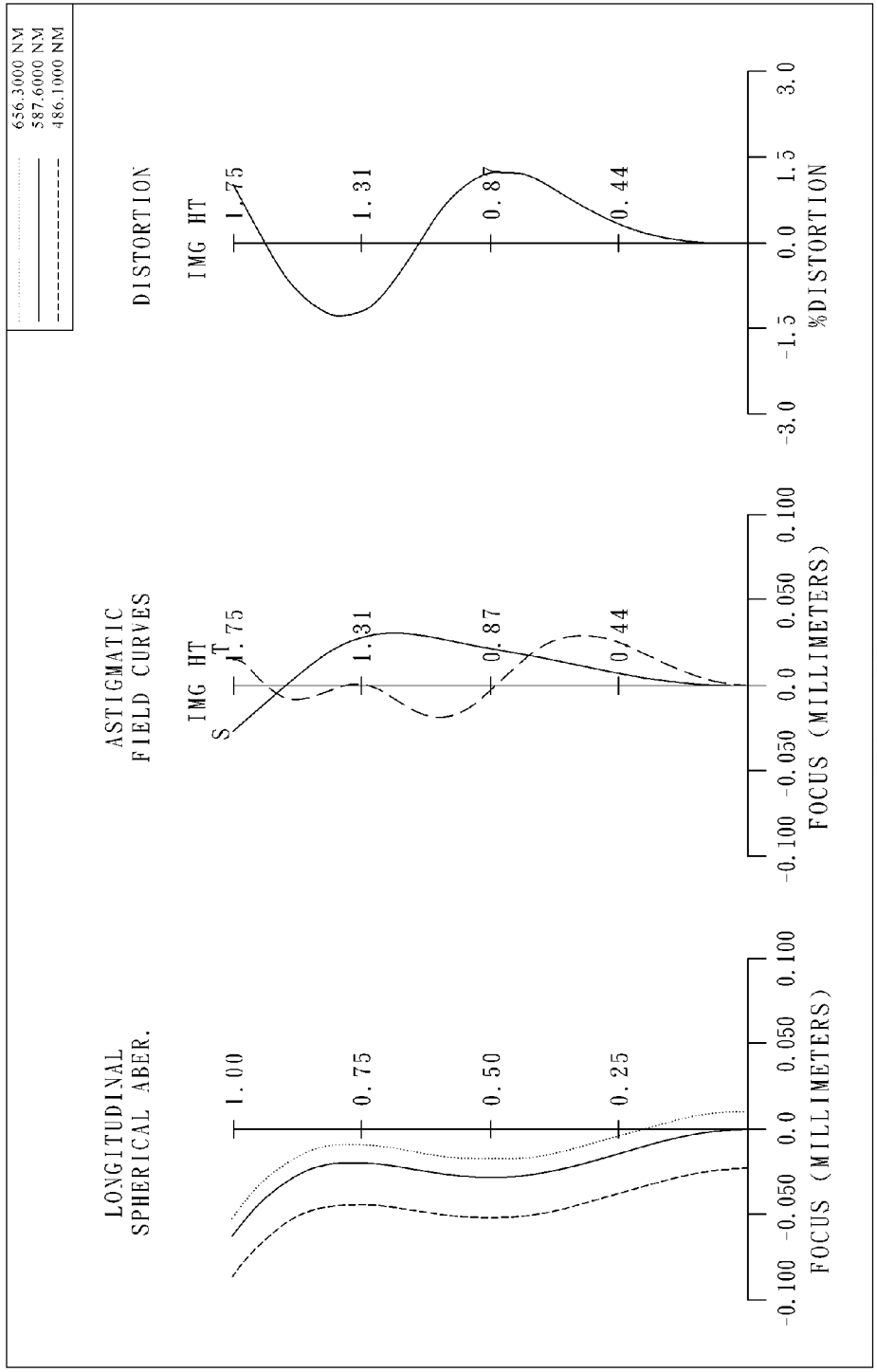
FIG. 3B shows the aberration curves of the third embodiment of the present invention.

FIG. 3A shows a photographing optical lens assembly in accordance with a third embodiment of the present invention, and FIG. 3B shows the aberration curves of the third embodiment of the present invention. The photographing optical lens assembly in the third embodiment mainly comprises three lens elements, in order from an object side to an image side: a plastic first lens element 310 with positive refractive power having a convex object-side surface 311 and a concave image-side surface 312, both of the surfaces 311 and 312 being aspheric; a plastic second lens element 320 with negative refractive power having a concave object-side surface 321 and a convex image-side surface 322, both of the surfaces 321 and 322 being aspheric; and a plastic third lens element 330 with negative refractive power having a convex object-side surface 331 and a concave image-side surface 332, both of the surfaces 331 and 332 being aspheric and at least one inflection point being formed on the image-side surface 332. The lens assembly is also provided with a stop 300 disposed between an object and the first lens element 310. The photographing optical lens assembly further comprises an IR-filter 340 disposed between the image-side surface 332 of the third lens element 330 and an image plane 350. The IR-filter 340 is made of glass and has no influence on the focal length of the photographing optical lens assembly.

The equation of the aspheric surface profiles of the third embodiment has the same form as that of the first embodiment.

In the third embodiment of the present photographing optical lens assembly, the focal length of the lens assembly is f, and it satisfies the relation: f=2.55 (mm).

In the third embodiment of the present photographing optical lens assembly, the f-number of the lens assembly is Fno, and it satisfies the relation: Fno=2.80.

In the third embodiment of the present photographing optical lens assembly, half of the maximum field of view of the lens assembly is HFOV, and it satisfies the relation: HFOV=34.1 (degrees).

In the third embodiment of the present photographing optical lens assembly, the Abbe number of the first lens element 310 is V1, the Abbe number of the second lens element 320 is V2, and they satisfy the relation: V1−V2=32.5.

In the third embodiment of the present photographing optical lens assembly, the distance on the optical axis between the first lens element 310 and the second lens element 320 is T12, the distance on the optical axis between the second lens element 320 and the third lens element 330 is T23, and they satisfy the relation: T12/T23=1.30.

In the third embodiment of the present photographing optical lens assembly, the radius of curvature of the object-side surface 311 of the first lens element 310 is R1, the radius of curvature of the image-side surface 312 of the first lens element 310 is R2, and they satisfy the relation: R1/R2=0.19.

In the third embodiment of the present photographing optical lens assembly, the radius of curvature of the object-side surface 321 of the second lens element 320 is R3, the focal length of the lens assembly is f, and they satisfy the relation: R3/f=−0.43.

In the third embodiment of the present photographing optical lens assembly, the focal length of the lens assembly is f, the focal length of the first lens element 310 is f1, and they satisfy the relation: f/f1=1.14.

In the third embodiment of the present photographing optical lens assembly, the focal length of the lens assembly is f, the focal length of the second lens element 320 is f2, and they satisfy the relation: f/f2=−0.25.

In the third embodiment of the present photographing optical lens assembly, the focal length of the lens assembly is f, the focal length of the third lens element 330 is f3, and they satisfy the relation: |f/f3|=0.18.

In the third embodiment of the present photographing optical lens assembly, an electronic sensor is disposed at the image plane 350 for image formation of the object; the vertex of the object-side surface 321 of the second lens element 320 on the optical axis is T1; when the image height of the system is half of the diagonal length of the effective pixel area of the electronic sensor, the farthest point of the effective light entry area on the object-side surface 321 of the second lens element 320 is P1; the distance on the optical axis between T1 and the vertical projection of P1 on the optical axis is SAG21; the distance between P1 and its vertical projection on the optical axis is Y21; and they satisfy the relation: |SAG21/Y21|=0.29.

In the third embodiment of the present photographing optical lens assembly, the vertex of the image-side surface 322 of the second lens element 320 on the optical axis is T2; when the image height of the system is half of the diagonal length of the effective pixel area of the electronic sensor, the farthest point of the effective light entry area on the image-side surface 322 of the second lens element 320 is P2; the distance on the optical axis between T2 and the vertical projection of P2 on the optical axis is SAG22; the distance between P2 and its vertical projection on the optical axis is Y22; and they satisfy the relation: |SAG22/Y22|=0.15.

In the third embodiment of the present photographing optical lens assembly, the distance on the optical axis between the stop 300 and the electronic sensor is SL, the distance on the optical axis between the object-side surface 311 of the first lens element 310 and the electronic sensor is TTL, and they satisfy the relation: SL/TTL=0.97.

In the third embodiment of the present photographing optical lens assembly, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=1.59.

The detailed optical data of the third embodiment is shown in FIG. 9 (TABLE 5), and the aspheric surface data is shown in FIG. 10 (TABLE 6), wherein the units of the radius of curvature, the thickness and the focal length are expressed in mm, and HFOV is half of the maximum field of view.

Figure 4A:
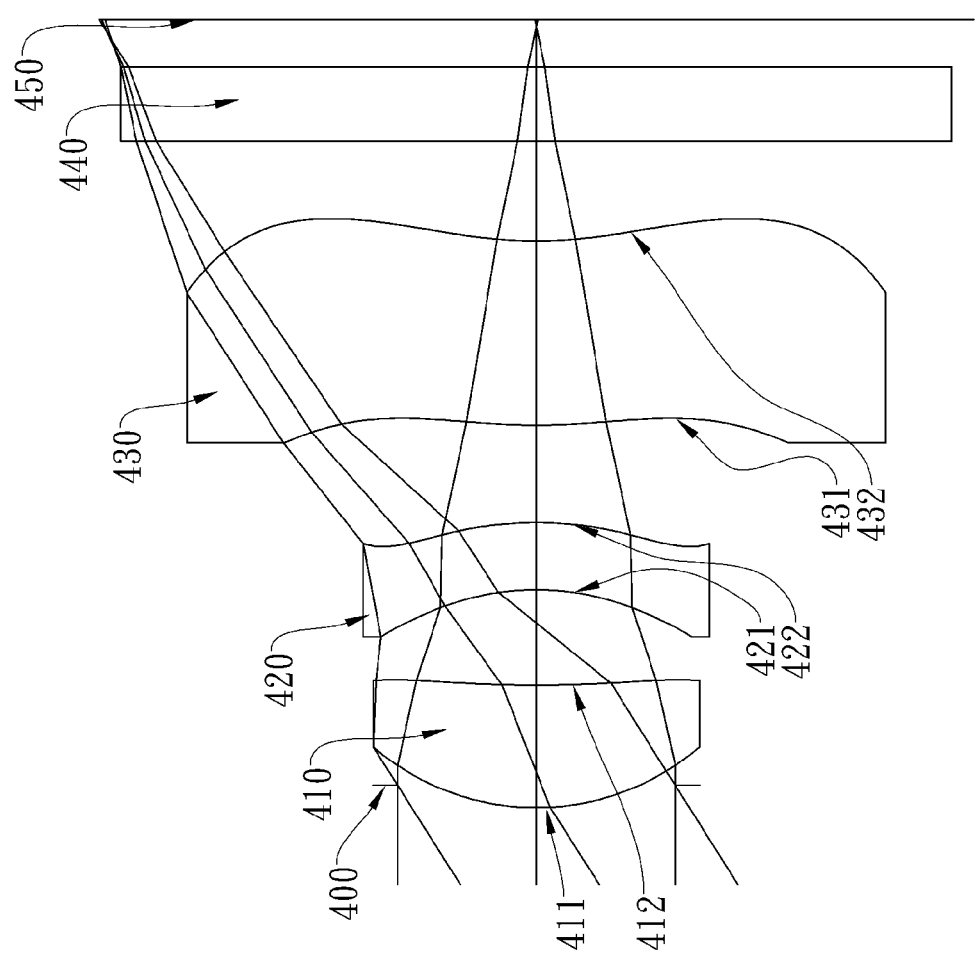
FIG. 4A shows a photographing optical lens assembly in accordance with a fourth embodiment of the present invention.
Figure 4B:
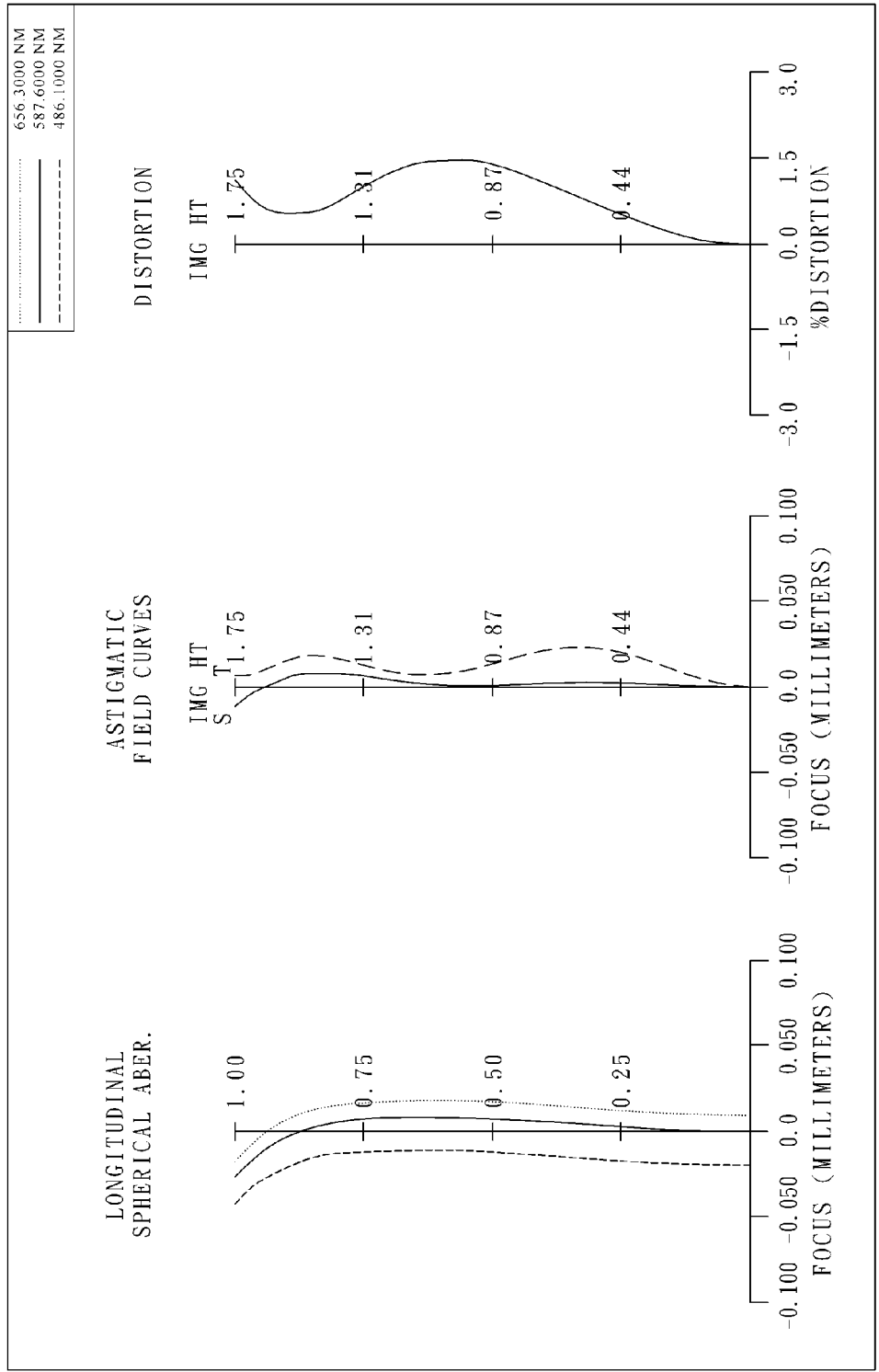
FIG. 4B shows the aberration curves of the fourth embodiment of the present invention.

FIG. 4A shows a photographing optical lens assembly in accordance with a fourth embodiment of the present invention, and FIG. 4B shows the aberration curves of the fourth embodiment of the present invention. The photographing optical lens assembly in the fourth embodiment mainly comprises three lens elements, in order from an object side to an image side: a plastic first lens element 410 with positive refractive power having a convex object-side surface 411 and a concave image-side surface 412, both of the surfaces 411 and 412 being aspheric; a plastic second lens element 420 with negative refractive power having a concave object-side surface 421 and a convex image-side surface 422, both of the surfaces 421 and 422 being aspheric; a plastic third lens element 430 with negative refractive power having a convex object-side surface 431 and a concave image-side surface 432, both of the surfaces 431 and 432 being aspheric and at least one inflection point being formed on the image-side surface 432. The lens assembly is also provided with a stop 400 disposed between an object and the first lens element 410. The photographing optical lens assembly further comprises an IR-filter 440 disposed between the image-side surface 432 of the third lens element 430 and an image plane 450. The IR-filter 440 is made of glass and has no influence on the focal length of the photographing optical lens assembly.

The equation of the aspheric surface profiles of the fourth embodiment has the same form as that of the first embodiment.

In the fourth embodiment of the present photographing optical lens assembly, the focal length of the lens assembly is f, and it satisfies the relation: f=2.75 (mm).

In the fourth embodiment of the present photographing optical lens assembly, the f-number of the lens assembly is Fno, and it satisfies the relation: Fno=2.45.

In the fourth embodiment of the present photographing optical lens assembly, half of the maximum field of view of the lens assembly is HFOV, and it satisfies the relation: HFOV=32.3 (degrees).

In the fourth embodiment of the present photographing optical lens assembly, the Abbe number of the first lens element 410 is V1, the Abbe number of the second lens element 420 is V2, and they satisfy the relation: V1−V2=34.5.

In the fourth embodiment of the present photographing optical lens assembly, the distance on the optical axis between the first lens element 410 and the second lens element 420 is T12, the distance on the optical axis between the second lens element 420 and the third lens element 430 is T23, and they satisfy the relation: T12/T23=0.98.

In the fourth embodiment of the present photographing optical lens assembly, the radius of curvature of the object-side surface 411 of the first lens element 410 is R1, the radius of curvature of the image-side surface 412 of the first lens element 410 is R2, and they satisfy the relation: R1/R2=0.21.

In the fourth embodiment of the present photographing optical lens assembly, the radius of curvature of the object-side surface 421 of the second lens element 420 is R3, the focal length of the lens assembly is f, and they satisfy the relation: R3/f=−0.39.

In the fourth embodiment of the present photographing optical lens assembly, the focal length of the lens assembly is f, the focal length of the first lens element 410 is f1, and they satisfy the relation: f/f1=1.25.

In the fourth embodiment of the present photographing optical lens assembly, the focal length of the lens assembly is f, the focal length of the second lens element 420 is f2, and they satisfy the relation: f/f2=−0.37.

In the fourth embodiment of the present photographing optical lens assembly, the focal length of the lens assembly is f, the focal length of the third lens element 430 is f3, and they satisfy the relation: |f/f3|=0.12.

In the fourth embodiment of the present photographing optical lens assembly, an electronic sensor is further provided which is disposed at the image plane 450 for image formation of the object; the vertex of the object-side surface 421 of the second lens element 420 on the optical axis is T1; when the image height of the system is half of the diagonal length of the effective pixel area of the electronic sensor, the farthest point of the effective light entry area on the object-side surface 421 of the second lens element 420 is P1; the distance on the optical axis between T1 and the vertical projection of P1 on the optical axis is SAG21; the distance between P1 and its vertical projection on the optical axis is Y21; and they satisfy the relation: |SAG21/Y21|=0.29.

In the fourth embodiment of the present photographing optical lens assembly, the vertex of the image-side surface 422 of the second lens element 420 on the optical axis is T2; when the image height of the system is half of the diagonal length of the effective pixel area of the electronic sensor, the farthest point of the effective light entry area on the image-side surface 422 of the second lens element 420 is P2; the distance on the optical axis between T2 and the vertical projection of P2 on the optical axis is SAG22; the distance between P2 and its vertical projection on the optical axis is Y22; and they satisfy the relation: |SAG22/Y22|=0.15.

In the fourth embodiment of the present photographing optical lens assembly, the distance on the optical axis between the stop 400 and the electronic sensor is SL, the distance on the optical axis between the object-side surface 411 of the first lens element 410 and the electronic sensor is TTL, and they satisfy the relation: SL/TTL=0.97.

In the fourth embodiment of the present photographing optical lens assembly, the distance on the optical axis between the object-side surface 411 of the first lens element 410 and the electronic sensor is TTL, half of the diagonal length of the effective pixel area of the electronic sensor is ImgH, and they satisfy the relation: TTL/ImgH=1.76.

The detailed optical data of the fourth embodiment is shown in FIG. 11 (TABLE 7), and the aspheric surface data is shown in FIG. 12 (TABLE 8), wherein the units of the radius of curvature, the thickness and the focal length are expressed in mm, and HFOV is half of the maximum field of view.

It is to be noted that TABLES 1-8 (illustrated in FIGS. 5-12 respectively) show different data of the different embodiments; however, the data of the different embodiments are obtained from experiments. Therefore, any photographing optical lens assembly of the same structure is considered to be within the scope of the present invention even if it uses different data. The preferred embodiments depicted above are exemplary and are not intended to limit the scope of the present invention. TABLE 9 (illustrated in FIG. 13) shows the data of the respective embodiments resulting from the equations.

What is claimed is:

1. A photographing optical lens assembly comprising, in order from an object side to an image side:
   a first lens element with positive refractive power having a convex object-side surface and a concave image-side surface;
   a second lens element with negative refractive power having a concave object-side surface and a convex image-side surface, the object-side and image-side surfaces thereof being aspheric;
   a third lens element with negative refractive power having a convex object-side surface and a concave image-side surface, the object-side and image-side surfaces thereof being aspheric, and at least one inflection point being formed on the image-side surface;
   wherein the lens assembly is further provided with an electronic sensor disposed at an image plane for image formation of an object, and a stop disposed between the object and the first lens element; wherein a distance on an optical axis between the first lens element and the second lens element is T12; a distance on the optical axis between the second lens element and the third lens element is T23; a focal length of the lens assembly is f; a focal length of the second lens element is f2; a radius of curvature of the object-side surface of the first lens element is R1; a radius of curvature of the image-side surface of the first lens element is R2; a radius of curvature of the object-side surface of the second lens element is R3; a vertex of the image-side surface of the second lens element on the optical axis is T2; when an image height of the system is half of a diagonal length of an effective pixel area of the electronic sensor, a farthest point of an effective light entry area on the image-side surface of the second lens element is P2; a distance on the optical axis between T2 and a vertical projection of P2 on the optical axis is SAG22; a distance between P2 and its vertical projection on the optical axis is Y22; a vertex of the object-side surface of the second lens element on the optical axis is T1; when the image height of the system is half of the diagonal length of the effective pixel area of the electronic sensor, a farthest point of the effective light entry area on the object-side surface of the second lens element is P1; a distance on the optical axis between T1 and a vertical projection of P1 on the optical axis is SAG21; a distance between P1 and its vertical projection on the optical axis is Y21; a distance on the optical axis between the stop and the electronic sensor is SL; a distance on the optical axis between the object-side surface of the first lens element and the electronic sensor is TTL; and they satisfy the following relations:

$0.35 < T12/T23 < 1.95;$ $-0.50 < f/f2 < -0.10;$ $0.00 < R1/R2 < 0.32;$ $-0.65 < R3/f < -0.30;$ $|SAG21/Y21| < 0.33;$ $|SAG22/Y22| < 0.23;$ and $0.90 < SL/TTL < 1.07.$ 2. The photographing optical lens assembly according to claim 1, wherein the focal length of the lens assembly is f, the focal length of the first lens element is f1, and they satisfy the following relation:

$0.80 < f/f1 < 1.45.$

3. The photographing optical lens assembly according to claim 2, wherein the focal length of the lens assembly is f, the focal length of the first lens element is f1, and they satisfy the following relation:

$1.00 < f/f1 < 1.25.$

4. The photographing optical lens assembly according to claim 1, wherein an Abbe number of the first lens element is V1, an Abbe number of the second lens element is V2, and they satisfy the following relation:

$32.0 < V1 - V2 < 42.0.$

5. The photographing optical lens assembly according to claim 2, wherein the focal length of the lens assembly is f, the focal length of the second lens element is f2, and they satisfy the following relation:

$-0.38 < f/f2 < -0.18.$

6. The photographing optical lens assembly according to claim 2, wherein the vertex of the image-side surface of the second lens element on the optical axis is T2; when the image height of the system is half of the diagonal length of the effective pixel area of the electronic sensor, the farthest point of the effective light entry area on the image-side surface of the second lens element is P2; the distance on the optical axis between T2 and the vertical projection of P2 on the optical axis is SAG22; the distance between P2 and its vertical projection on the optical axis is Y22; and they satisfy the following relation:

$|SAG22/Y22| < 0.18.$

7. The photographing optical lens assembly according to claim 2, wherein the distance on the optical axis between the first lens element and the second lens element is T12, the distance on the optical axis between the second lens element and the third lens element is T23, and they satisfy the following relation:

$0.60 < T12/T23 < 1.65.$

8. The photographing optical lens assembly according to claim 7, wherein the radius of curvature of the object-side surface of the first lens element is R1, the radius of curvature of the image-side surface of the first lens element is R2, and they satisfy the following relation:

$0.00 < R1/R2 < 0.20.$

9. The photographing optical lens assembly according to claim 4, wherein the focal length of the lens assembly is f, a focal length of the third lens element is f3, and they satisfy the following relation:

$|f/f3| < 0.20.$

10. The photographing optical lens assembly according to claim 1, wherein the distance on the optical axis between the object-side surface of the first lens element and the electronic sensor is TTL, half of the diagonal length of the effective pixel area of the electronic sensor is ImgH, and they satisfy the following relation:

$TTL/ImgH < 1.80.$

11. The photographing optical lens assembly according to claim 10, wherein the distance on the optical axis between the object-side surface of the first lens element and the electronic sensor is TTL, half of the diagonal length of the effective pixel area of the electronic sensor is ImgH, and they satisfy the following relation:

$TTL/ImgH < 1.65.$

12. A photographing optical lens assembly comprising, in order from an object side to an image side:
   a first lens element with positive refractive power having a convex object-side surface and a concave image-side surface, the object-side and image-side surfaces thereof being aspheric;
   a second lens element with negative refractive power having a concave object-side surface and a convex image-side surface, the object-side and image-side surfaces thereof being aspheric; and
   a third lens element with negative refractive power having a convex object-side surface and a concave image-side surface, the object-side and image-side surfaces thereof being aspheric, and at least one inflection point being formed on the image-side surface;
   wherein the lens assembly is further provided with an electronic sensor disposed at an image plane for image formation of an object, and a stop disposed between the object and the first lens element; a distance on an optical axis between the first lens element and the second lens element is T12; a distance on the optical axis between the second lens element and the third lens element is T23; a focal length of the lens assembly is f; a focal length of the second lens element is f2; a radius of curvature of the object-side surface of the second lens element is R3; an Abbe number of the first lens element is V1; an Abbe number of the second lens element is V2; a distance on the optical axis between the stop and the electronic sensor is SL; a distance on the optical axis between the object-side surface of the first lens element and the electronic sensor is TTL; and they satisfy the following relations:

$0.60 < T12/T23 < 1.65;$ $-0.50 < f/f2 < -0.10;$ $-0.65 < R3/f < -0.30;$ $32.0 < V1 - V2 < 42.0;$ and $0.90 < SL/TTL < 1.07.$ 13. The photographing optical lens assembly according to claim 12, wherein the Abbe number of the second lens element is V2, and it satisfies the following relation:

$V2 < 24.0.$

14. The photographing optical lens assembly according to claim 13, wherein a radius of curvature of the object-side surface of the first lens element is R1, a radius of curvature of the image-side surface of the first lens element is R2, and they satisfy the following relation:

$0.00 < R1/R2 < 0.20.$

15. The photographing optical lens assembly according to claim 13, wherein the focal length of the lens assembly is f, the focal length of the second lens element is f2, and they satisfy the following relation:

$-0.38 < f/f2 < -0.18.$

16. The photographing optical lens assembly according to claim 13, wherein the distance on the optical axis between the object-side surface of the first lens element and the electronic sensor is TTL, half of a diagonal length of an effective pixel area of the electronic sensor is ImgH, and they satisfy the following relation:

$TTL/ImgH < 1.65.$

* * * * *

UNITED STATES PATENT AND TRADEMARK OFFICE
CERTIFICATE OF CORRECTION

| | | |
|---|---|---|
| PATENT NO. | : 8,000,033 B1 | |
| APPLICATION NO. | : 12/952344 | |
| DATED | : August 16, 2011 | |
| INVENTOR(S) | : Hsiang Chi Tan et al. | |

It is certified that error appears in the above-identified patent and that said Letters Patent is hereby corrected as shown below:

Column 15:
Line 33: "|SAG22/Y22<0.23" should read
--|SAG22/Y22|<0.23--

Signed and Sealed this
Fourteenth Day of February, 2012

David J. Kappos
*Director of the United States Patent and Trademark Office*